UNITED STATES PATENT OFFICE.

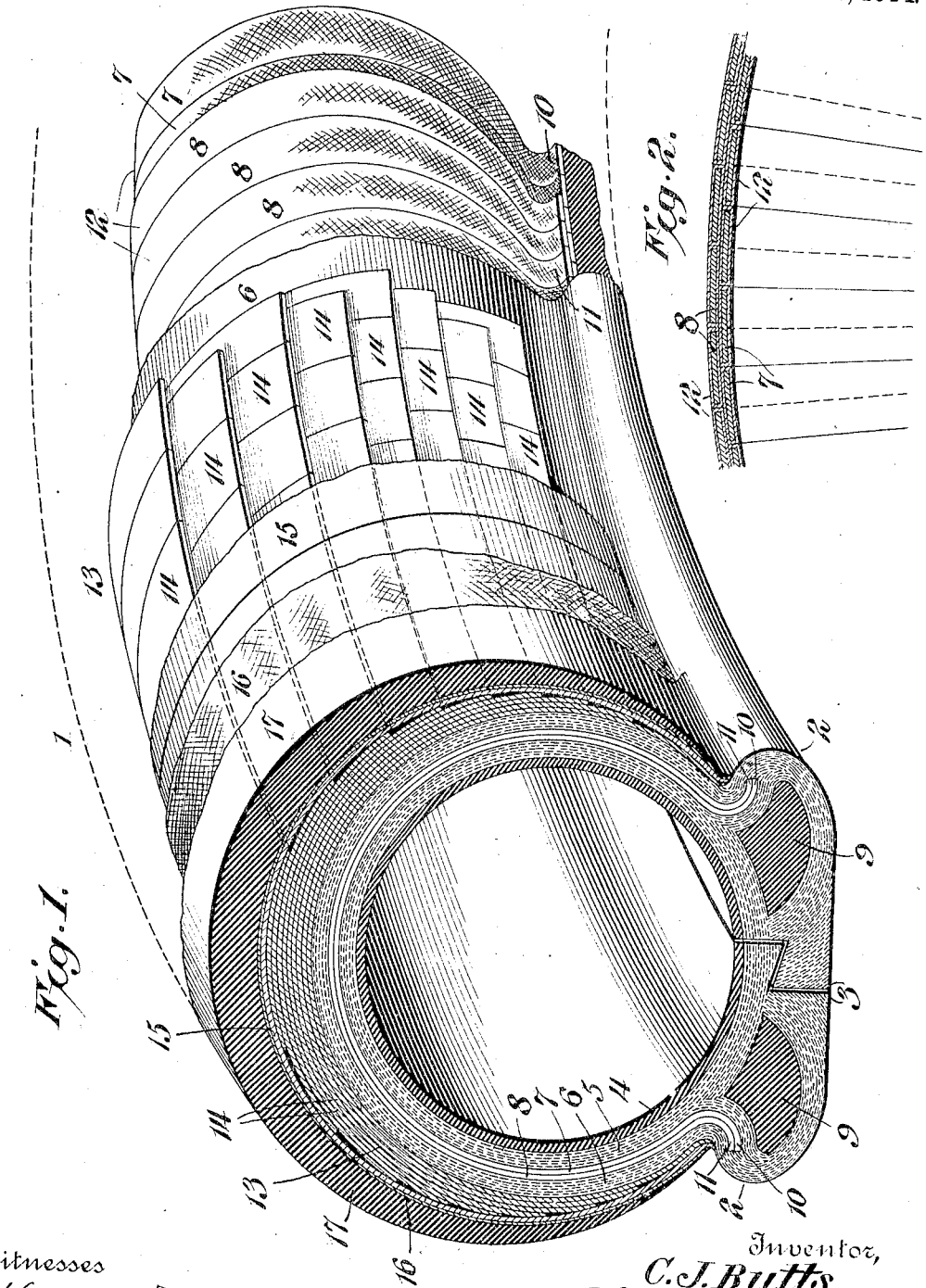

CARTER J. BUTTS, OF BOSTON, MASSACHUSETTS.

AUTOMOBILE-TIRE.

1,083,798.   Specification of Letters Patent.   Patented Jan. 6, 1914.

Application filed May 25, 1911. Serial No. 629,453.

*To all whom it may concern:*

Be it known that I, CARTER J. BUTTS, a citizen of the United States, residing at Boston, in the county of Suffolk and State of Massachusetts, have invented a new and useful Automobile-Tire, of which the following is a specification.

The invention relates to improvements in tires for automobiles and similar vehicle wheels.

The object of the present invention is to improve the construction of tires for automobiles and other vehicles, and to provide a simple, efficient and comparatively inexpensive tire, designed primarily for use in connection with an inner inflatable tube, and adapted to form a puncture proof casing or outer tube, capable of effectually protecting the inner tube and of preventing the same from being cut, punctured or otherwise injured.

A further object of the invention is to provide an automobile tire of this character, equipped with springs arranged to form a protecting armor, and capable of producing a highly resilient tire, and adapted to be constructed of sufficient strength to carry the load, whereby the tire may be used either with or without an inner tube.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a sectional perspective view of a portion of a resilient puncture proof tire, constructed in accordance with this invention. Fig. 2 is a detail sectional view, illustrating the arrangement of the protecting springs.

Like numerals of reference designate corresponding parts in all the figures of the drawing.

In the accompanying drawing in which is illustrated the preferred embodiment of the invention, 1 designates a tubular automobile tire, consisting of a unitary structure and having the form of an ordinary pneumatic tire, and adapted to be constructed to fit the various patterns of wheel rims. In the form illustrated, the tire is of the clencher type, and is provided at opposite sides of the base with longitudinal beads or ribs 2 for engagement with the rim of a wheel, and the meeting longitudinal edges 3 at the center of the base of the tire are formed by projecting portions tapered outwardly from inner radially arranged edges and overlapped and interlocked, as shown, but they may be of any other preferred construction. By means of the overlapping interlocking joint shown in Fig. 1, the meeting longitudinal edges 3 at the center of the base are maintained in interlocked relation by internal pressure. The interior of the tire is substantially circular in cross section to adapt it for the reception of an inner tube, and the tire is provided with an inner tubular lining 4 of rubber, but any other suitable material may be employed in the construction of the inner lining of the tire.

The main body portion of the tire is composed of two layers 5 and 6, arranged interiorly and exteriorly of inner and outer series 7 and 8 of the springs and enveloping the same. The inner and outer layers 5 and 6 are designed to be constructed of canvas, or other suitable fabric, which is preferably provided with sufficient rubber to enable the material of the tire to be vulcanized or otherwise united into a single piece or one solid mass. The inner and outer fabric layers 5 and 6 are preferably united at the inner attaching portion or base of the tire, and longitudinal annular strips 9 of any suitable material are preferably arranged within the fabric layers to form the side beads or ribs 2.

The springs 7 and 8 are arranged in a circumferential series and extend around the tire transversely thereof, and their terminals 10 and 11 are curved outwardly or hook-shaped and extend into the side beads or ribs 2. The inner series of springs 7 are arranged side by side to form a complete metallic protecting armor for the tire, and the outer series 8 are arranged on the inner series and break joints with the same, the springs of the outer series covering the side edges of the springs of the inner series. By this arrangement, the springs are adapted to effectually prevent an inner inflatable tire from being cut or punctured. The springs are tapered to enable them to fit snugly together, and they are arranged within fabric coverings or casings 12 of canvas, or other suitable material. The fabric casings of the springs are adapted to prevent the metal from cutting, wearing or otherwise injuring the adjacent portions of the tire. The springs may be varied in thickness and may be constructed of sufficient strength to carry the load, and thereby obviate the necessity of employing an inner inflatable tube, but when the tire is equipped with an inner tube, the springs are relatively light to render the outer casing highly resilient.

The layers 5 and 6 are preferably of uniform thickness around the tire, and the latter is provided with an intermediate section 13, tapering in thickness from the center of the tread portion of the tire to the sides thereof, and composed of layers of transversely disposed tapering strips 14 of fabric, which successively decrease in length from the inner layer to the outer layer 15, the strips of which are of uniform length with the strips of the inner layer. The strips are arranged in overlapping relation, so that the strips of each layer or series overlap the side edges or break joints with the strips of the contiguous series or layers. The flexible fabric strips are designed to be saturated or impregnated with a suitable material to render them rot proof, and the intermediate section 13 is arranged within a continuous fabric covering 16 of canvas, or other suitable material, extending from one side of the tire to the other and forming an exterior covering or casing for the flexible strips, and designed also to be saturated or impregnated with a material for rendering it rot proof.

The tire is equipped with a transversely tapered tread section 17, designed to be constructed of rubber, or rubber and fabric, and it may be exteriorly corrugated in any desired manner to prevent the tire from slipping or skidding.

In the construction of the sections or layers of the tire, asbestos may be substituted for fabric or used in connection with the same.

Having thus fully described my invention, what I claim as new and desire to secure by Letters Patent, is:—

1. A tubular tire including an inner tubular body portion, an intermediate section consisting of layers of flexible transversely disposed strips arranged in overlapping relation and successively decreasing in length outwardly to form an outer thickened portion at the tread of the tire and tapering side portions extending from the thickened portion to the base of the tire, and an outer tread section substantially coextensive with the intermediate section.

2. A tubular tire including an inner tubular body portion, an intermediate section consisting of layers of flexible transversely disposed strips arranged in overlapping relation and successively decreasing in length to the outermost layer and the strips of the latter being of substantially uniform length with the strips of the innermost layer, a continuous fabric casing covering the intermediate section and extending from one side of the tire to the other, and an outer tapered tread section substantially coextensive with the intermediate tapered section and having side portions tapered from the tread of the tire to the base thereof and terminating at opposite sides of the same.

3. A tubular tire including an inner tubular body portion consisting of inner and outer tubular layers extending inwardly and outwardly at opposite sides of the base of the tire and having bottom connecting portions forming beads, the outer portions or walls of the beads being thickened, springs arranged between the inner and outer layers of the body portion to form a metallic armor and having outwardly curved terminal portions extending partially around the said beads at the outer walls thereof and embedded in the enlargements of the same, an intermediate tapered section consisting of layers of flexible transversely disposed strips arranged in overlapping relation and successively decreasing in length to the outermost layer and forming a thickened outer portion at the tread of the tire and inwardly tapered side portions, which terminate at the ends of the said springs, and an outer or tread section substantially coextensive with the intermediate section.

In testimony, that I claim the foregoing as my own, I have hereto affixed my signature in the presence of two witnesses.

CARTER J. BUTTS.

Witnesses:
M. I. BUTTS,
ROBERT E. CLARK.